US010033654B2

(12) United States Patent
Kim et al.

(10) Patent No.: US 10,033,654 B2
(45) Date of Patent: Jul. 24, 2018

(54) IDENTIFIER BASED COMMUNICATION SYSTEM AND METHOD FOR CONTROLLING DATA TRANSPORT THEREIN

(71) Applicant: Electronics and Telecommunications Research Institute, Daejeon (KR)

(72) Inventors: Jeong Hwan Kim, Daejeon (KR); Cin Young Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 261 days.

(21) Appl. No.: 14/962,800

(22) Filed: Dec. 8, 2015

(65) Prior Publication Data

US 2016/0218985 A1 Jul. 28, 2016

(30) Foreign Application Priority Data

Jan. 27, 2015 (KR) .......................... 10-2015-0012953

(51) Int. Cl.
*H04L 29/06* (2006.01)
*H04L 12/801* (2013.01)
*H04L 12/835* (2013.01)

(52) U.S. Cl.
CPC .............. *H04L 47/29* (2013.01); *H04L 47/13* (2013.01); *H04L 47/30* (2013.01)

(58) Field of Classification Search
None
See application file for complete search history.

(56) References Cited

U.S. PATENT DOCUMENTS

| 9,015,335 B1* | 4/2015 | Gigliotti | G06F 17/30017 348/415.1 |
| 2004/0003101 A1* | 1/2004 | Roth | H04L 29/06027 709/231 |
| 2004/0267503 A1* | 12/2004 | Batterberry | H04L 29/06027 702/188 |

(Continued)

FOREIGN PATENT DOCUMENTS

| KR | 1020110088441 A | 8/2011 |
| KR | 1020120074121 A | 7/2012 |
| KR | 1020130006821 A | 1/2013 |

*Primary Examiner* — Gregory Sefcheck
*Assistant Examiner* — Jenkey Van
(74) *Attorney, Agent, or Firm* — William Park & Associates Ltd.

(57) ABSTRACT

Disclosed are an ID based communication system and a method for controlling data transport therein. A method according to an exemplary embodiment of the present invention includes: by a data receiving apparatus, generating and transporting an information request message for requesting data information of contents corresponding to a content ID; receiving a response message including the data information regarding the contents corresponding to the content ID from any one data providing apparatus; deciding one or more requested data among the data corresponding to the contents and generating and transporting a data request message for requesting transportation of the requested data to the data providing apparatus; and receiving the detected data from the data providing apparatus, wherein the data providing apparatus detects one or more requested data verified from the data request message among the data corresponding to the contents.

15 Claims, 7 Drawing Sheets

(56) References Cited

U.S. PATENT DOCUMENTS

| | | | |
|---|---|---|---|
| 2006/0117365 A1* | 6/2006 | Ueda | G11B 27/031 |
| | | | 725/112 |
| 2008/0248758 A1* | 10/2008 | Schedelbeck | H04L 1/1614 |
| | | | 455/69 |
| 2010/0011088 A1* | 1/2010 | Gautier | H04L 1/1809 |
| | | | 709/217 |
| 2011/0125877 A1* | 5/2011 | Prathaban, Sr. | G06F 17/3089 |
| | | | 709/219 |
| 2011/0185083 A1 | 7/2011 | Jung | |
| 2011/0314095 A1* | 12/2011 | Gupta | H04N 21/23412 |
| | | | 709/203 |
| 2014/0098819 A1 | 4/2014 | Etri | |
| 2015/0208120 A1* | 7/2015 | Yao | H04N 21/25833 |
| | | | 725/9 |

* cited by examiner

IDENTIFIER BASED COMMUNICATION SYSTEM AND METHOD FOR CONTROLLING DATA TRANSPORT THEREIN

CROSS-REFERENCE TO RELATED APPLICATIONS

This application claims priority to and the benefit of Korean Patent Application No. 10-2015-0012953 filed in the Korean Intellectual Property Office on Jan. 27, 2015, the entire contents of which are incorporated herein by reference.

TECHNICAL FIELD

The present invention relates to an identifier (ID) based communication system and a method for controlling data transport therein, and to technology that controls a flow of data transport centering around a receiver.

BACKGROUND ART

In an identifier (ID) based communication structure in which an ID and a locator are separated, a principal communication agent may perform communication by designating not an IP address but the identifier of a communication target without regarding networking related contents including an address, transport characteristics, and the like. In this case, in the ID based communication structure, an ID/locator mapping system providing mapping the locator for a location to a target ID is present, a location of the target ID is acquired through the ID/locator mapping system, and routing and forwarding for the target ID are performed based thereon to transport data.

In an IP based communication structure, the flow control and error control take place in the both side of hosts because the IP addresses are bound to the network interface of each host.

However, in ID based networking, a receiver side requests the content which is identified by its ID. In this situation, the actual location of content is not determined until the request has been made. Besides, multiple copies of the contents may be present in different locations and contents may be possible to move from one location to another location during the transportation of contents. So, the legacy transport control scheme is not appropriate in the ID/locator separation structure.

SUMMARY OF THE INVENTION

The present invention has been made in an effort to provide an ID based communication system appropriate to an ID/locator separation structure and a method for controlling data transport therein.

The present invention has also been made in an effort to provide an ID based communication system and a method for controlling data transport therein which separate dependency between the data receiving apparatus requesting contents and a data providing apparatus providing the contents and manage flow processing and error processing related with the data transport centering around a data receiving apparatus in transporting/receiving data regarding a content identifier in an ID/locator separation structure.

An exemplary embodiment of the present invention provides a method for controlling data transport in an ID based communication system including: by a data receiving apparatus, generating and transporting an information request message for requesting data information of contents corresponding to a content ID; receiving a response message including the data information regarding the contents corresponding to the content ID from any one data providing apparatus providing the contents requested by the data receiving apparatus; deciding one or more requested data among the data corresponding to the contents based on the data information included in the received response message and generating and transporting a data request message for requesting transportation of the requested data to the data providing apparatus; and receiving the detected data from the data providing apparatus, wherein the data providing apparatus detects one or more requested data verified from the data request message among the data corresponding to the contents.

The response message may requisitely include a total data size of the contents and a unit transport size of the contents, and selectively include data sending rate of the data providing apparatus.

The method may further include, by a data receiving apparatus, determining the total number of data corresponding to the contents based on the total data size of the contents and the unit transport size of the contents included in the response message.

In the generating and transporting of the data request message, some or all of the data corresponding to the contents may be decided as the requested data according to specifications such as the data sending rate of the data providing apparatus, the total data size of the contents, the unit transport size of the contents, data receiving rate of the data receiving apparatus, and a buffer size.

The data request message includes start information and end information for one or more request data among the data corresponding to the contents.

In the receiving of the detected data, requested data corresponding to a start sequence among the detected requested data may be first sequentially received based on the start information and the end information of the requested data included in the data request message.

In the receiving of the detected data, a response message including sequence information of the detected data and payload data may be received.

The information request message may include the content ID and data receiving rate of the data receiving apparatus.

The method may further include adjusting the data sending rate of the data providing apparatus based on the data receiving rate of the data receiving apparatus included in the information request message.

The method may further include setting a data sending speed of the data providing apparatus based on the adjusted data sending rate.

The method may further include transporting, by a data receiving apparatus, when unreceived data is present among the requested data, a data re-request message for requesting transportation of the unreceived data to the data providing apparatus.

The transporting of the data re-request message may include generating a sequence list based on sequence information regarding the unreceived data, and when transportation of the data from the data providing apparatus is completed, retransportation of the data corresponding to the sequence list may be requested.

The method may further include retransporting requested data corresponding to a sequence for the unreceived data to the data receiving apparatus from the data providing apparatus based on the data re-request message including the sequence information regarding the unreceived data among the requested data.

The method may further include setting, by the ID based communication network apparatus, a path between the data receiving apparatus and the corresponding data providing apparatus by determining the position of the data providing apparatus that is to transfer the information request message based on the content ID included in the information request message.

Meanwhile, another exemplary embodiment of the present invention provides an ID based communication system including: multiple data providing apparatuses managing data corresponding to one or more contents and information of the data and providing requested data and the information of the data; and a data receiving apparatus transporting an information request message for requesting data information of contents corresponding to a content ID to the corresponding data providing apparatus, and verifying the data information regarding the contents from a response message in response to the information request message to request decided requested data among data corresponding to the contents to any one data providing apparatus providing the contents requested by the data receiving apparatus.

Herein, the data receiving apparatus may determine the total number of the data corresponding to the contents based on a total data size of the contents and a unit transport size of the contents included in the response message and decide some or all of the data corresponding to the contents as the requested data according to specifications such as data sending rate of the data providing apparatus, the total data size of the contents, the unit transport size of the contents, data receiving rate of the data receiving apparatus, and a buffer size.

The system may further include an ID based communication network apparatus determining the position of the data providing apparatus that is to transfer the information request message based on the content ID included in the information request message between the data receiving apparatus and the multiple data providing apparatuses to set a path between the data receiving apparatus and the corresponding data providing apparatus and transfer data.

According to exemplary embodiments of the present invention, dependency between the data receiving apparatus requesting contents and a data providing apparatus providing the contents is separated and a flow and an error are processed related with the data transport centering around a data receiving apparatus in transporting/receiving data regarding a content identifier in an ID/locator separation structure to efficiently transport data.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

Figure 1:
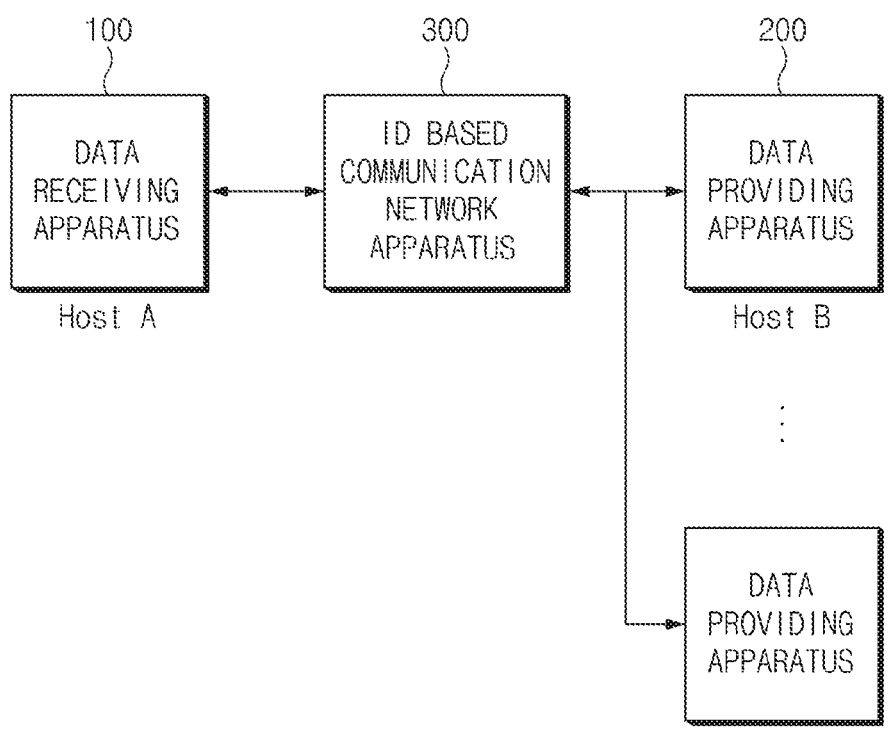
FIG. 1 is a diagram illustrating an ID based communication system according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is noted that technical terms used in the specification are used to just describe a specific exemplary embodiment and do not intend to limit the present invention. Further, unless otherwise defined, the technical terms used in the specification should be interpreted as meanings generally appreciated by those skilled in the art and should not be interpreted as excessively comprehensive meanings or excessively reduced meanings. Further, when the technical term used in the specification is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

Unless otherwise apparently specified contextually, a singular expression used in the specification includes a plural expression. In the specification, a term such as "comprising" or "including" should not be interpreted as necessarily including all various components or various steps disclosed in the specification, and it should be interpreted that some component or some steps among them may not be included or additional components or steps may be further included.

Terms including ordinal numbers, such as 'first' and 'second', used in the specification can be used to describe components, but the components should not be limited by the terms. The above terms are used only for distinguishing one component from the other component. For example, a first component may be named a second component and similarly, the second component may also be named the first component, without departing from the scope of the present invention.

Hereinafter, exemplary embodiments of the present invention will be described in detail with reference to the accompanying drawings, in which like reference numerals refer to like or similar elements regardless of reference numerals and a duplicated description thereof will be omitted.

In describing the present invention, when it is determined that the detailed description of the publicly known art related to the present invention may obscure the gist of the present invention, the detailed description thereof will be omitted. Further, it is noted that the accompanying drawings are only for easily understanding the spirit of the present invention and it should not be interpreted that the spirit of the present invention is limited by the accompanying drawings.

FIG. 1 is a diagram illustrating an ID based communication system according to the present invention.

Referring to FIG. 1, the ID based communication system according to the present invention performs communication based on IDs between two hosts (Host A and Host B) and in this case, the ID based communication system may include a data receiving apparatus (receiver) 100 and a data providing apparatus (source) 200.

Herein, since contents requested by the data receiving apparatus 100 may be stored in multiple data providing apparatuses, the data providing apparatus is not limited to any one of the multiple data providing apparatuses. However, in the following exemplary embodiment, it is assumed and described that the data providing apparatus 200 is an apparatus that provides the contents requested by the data receiving apparatus.

The data receiving apparatus 100 represents a means that requests data of the contents to the data providing apparatus 200 based on a content ID and receives and reproduces the data of the contents from the data providing apparatus 200.

The data receiving apparatus 100 may, as a prior operation for receiving contents, receive information of the data corresponding to the corresponding contents from the data providing apparatus 200 by using the content ID and decide the received data information and data requested to the data providing apparatus 200 based on information on the data receiving apparatus 100.

In other words, when the data providing apparatus 200 transports the data of the contents to the data receiving apparatus 100, the data providing apparatus 200 does not decide data to be transported according to a transport status but the data receiving apparatus 100 which is a target that receives the data directly decides received data by considering various statuses.

In this case, the data providing apparatus 200 determines the total number of the data corresponding to the contents based on a total data size of the contents and a unit transport size of the contents provided from the data providing apparatus 200 based on the content ID and decides as requested data some or all of the data corresponding to the contents according to specifications such as data sending rate of the data providing apparatus, the total data size of the contents, the unit transport size of the contents, data receiving rate of the data receiving apparatus 100, and a buffer size. That is, the data receiving apparatus 100 requests and receives data enough for the data receiving apparatus 100 to receive and process the data of itself.

Meanwhile, the data providing apparatus 200 represents a means that stores one or more content information, data regarding the corresponding contents, and information of the data, and provides the stored data and/or information according to a request of the data receiving apparatus 100. In this case, the data providing apparatus 200 serves to not control the transport status in order to transport the data and/or information requested from the data receiving apparatus 100 but transfer the data and/or information of the contents corresponding to the content ID to the data receiving apparatus 100 according to the request or control from the data receiving apparatus 100. Herein, path configuration and data transfer between the data receiving apparatus 100 and the data providing apparatus 200 are provided by an ID based communication network apparatus 300.

The ID based communication network apparatus 300 serves to determine the positions of the data receiving apparatus 100 and the data providing apparatus 200, configure a path, and transfer data based on the content ID requested from the data receiving apparatus 100.

In other words, the ID based communication network apparatus 300 analyzes (ID/locator mapping) a location at which the contents are actually present to correspond to the content ID, configures a routing path up to the data providing apparatus as a destination based the locator, and performs forwarding of an ID packet including a transporting side ID and a receiving side ID, with respect to the content request based on the content ID to provide ID packet transmission/reception between the data receiving apparatus 100 and the data providing apparatus 200.

Meanwhile, the data receiving apparatus 100 and/or the data providing apparatus 200 may be implemented in the form of an application program in the host and may be any one communication terminal. Herein, the communication terminal may correspond to a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical appliance, a camera, a wearable device, and a smart watch. Of course, it is natural that besides the aforementioned means, all apparatuses that may store or provide the contents and/or data or receive and reproduce the data may be applied. Therefore, detailed operations of the data receiving apparatus 100 and the data providing apparatus 200 will be described in more detail with reference to exemplary embodiments of FIGS. 2 to 6.

Figure 2:
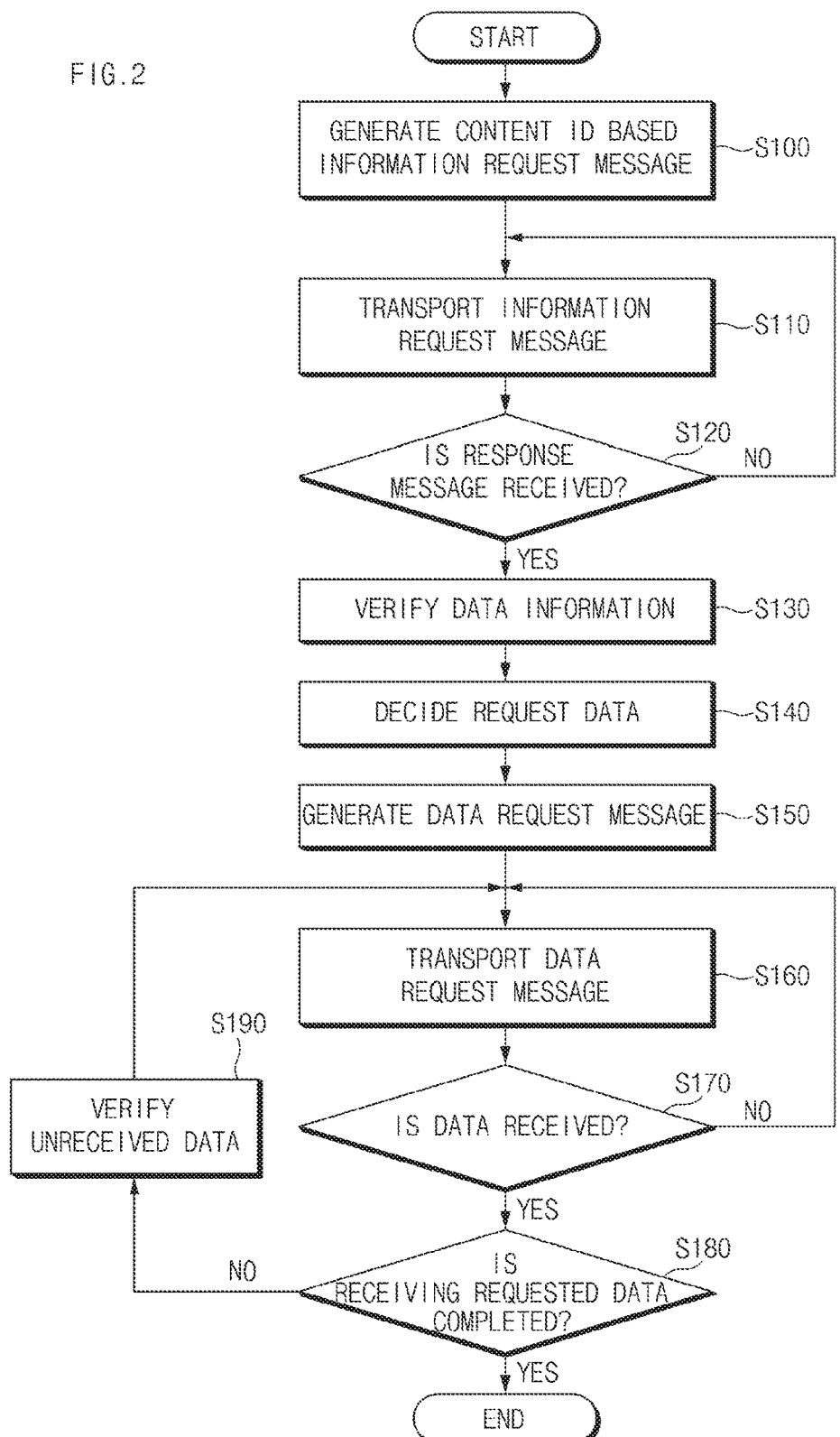
FIG. 2 is a flowchart illustrating an operational flow for a method for controlling data transport in a data receiving apparatus according to the present invention.

FIG. 2 is a flowchart illustrating an operational flow for a method for controlling data transport in a data receiving apparatus according to the present invention.

As illustrated in FIG. 2, the data receiving apparatus 100 generates a content ID based information request message to generate an information request message for requesting data information of contents corresponding to a content ID (S100) and transports the information request message generated during 'S100' to the data providing apparatus 200 (S110). Herein, the information request message may include the content ID and data receiving rate of the data receiving apparatus 100.

When the data receiving apparatus 100 receives a response message from the data providing apparatus 200 in response to the information request message transported during 'S110' (S120), the data receiving apparatus 100 verifies data information corresponding to the corresponding contents based on data information included in the response message (S130). Herein, the response message may include the data information of the contents corresponding to the content ID, for example, a total data size of the contents and a unit transport size (kbytes) of the contents and selectively include data sending rate of the data providing apparatus 200.

Herein, the data receiving apparatus 100 may verify the data information such as the data sending rate of the data providing apparatus 200, the total data size of the contents, and the unit transport size (Kbytes) of the contents during 'S130' and determine the total number of data corresponding to the corresponding contents based on the verified data information.

The data receiving apparatus 100 may decide one or more requested data among the data corresponding to the corresponding contents based on the verified data information (S140). During 'S140', the data receiving apparatus 100 may decide as the requested data some or all of the data corresponding to the contents according to the specifications such as the data sending rate of the data providing apparatus 200, the total data size of the contents, the unit transport size (Kbytes) of the contents, total number information of data, information on the data receiving apparatus 100, for example, the data receiving rate of the data receiving apparatus 100 and the buffer size. Of course, data selected by an application executed by the data receiving apparatus 100 of the requested data may be decided as the requested data.

As one example, when the contents are constituted by streaming data, the data receiving apparatus 100 may calculate a period when the streaming data may seamlessly reproduce the streaming data in the corresponding data receiving apparatus 100 in advance and decide a set unit to transport data according to the calculated period.

As another example, when the contents are constituted by download data, the data receiving apparatus 100 may decide a set unit to transport data according to a total size of data corresponding to the contents. In this case, the data receiving apparatus 100 compares the total size of the data corresponding to the contents and the buffer size of the data receiving apparatus 100 and when the total size of the data is smaller than the buffer size of the data receiving apparatus 100, the data receiving apparatus 100 may decide to the set unit to transport the data to include all data for the contents. On the contrary, when the total size of the data is larger than the buffer size of the data receiving apparatus 100, the data receiving apparatus 100 may decide the set unit to transport the data according to the buffer size of the data receiving apparatus 100.

Herein, the data receiving apparatus 100 may decide the requested data by the decided set unit among the data corresponding to the contents.

As such, when one or more requested data are decided among the data corresponding to the contents, the data receiving apparatus 100 generates a data request message for requesting transportation of the decided requested data (S150) and transports the data request message generated during 'S150' to the data providing apparatus 200 (S160). Herein, the data request message includes start information and end information of the requested data.

In this case, the data receiving apparatus 100 receives the requested data from the data providing apparatus 200 based on the data request message transported during 'S160'. When the requested data is not received so that a predetermined time elapses, the data receiving apparatus 100 may reperform 'S160'.

Meanwhile, when receiving the requested data is not completed while data transportation from the data providing apparatus 200 is completed (S180), the data receiving apparatus 100 verifies unreceived data among the requested data (S190) and reperforms 'S160'. However, in this case, during 'S160', a data re-request message for requesting retransportation of the unreceived data is transported to the data providing apparatus.

Herein, the data receiving apparatus 100 may verify sequence information regarding the unreceived data and generate a sequence list based on the verified sequence information. In this case, the data receiving apparatus 100 includes the sequence list to generate the data re-request message.

Meanwhile, in the exemplary embodiment of FIG. 2, it is illustrated that when the requested data is not received during 'S170', 'S160' and 'S170' are infinitely repeated, but after data transportation at the set number of recovery times is requested, request failure processing is performed and an operation may end.

Figure 3:
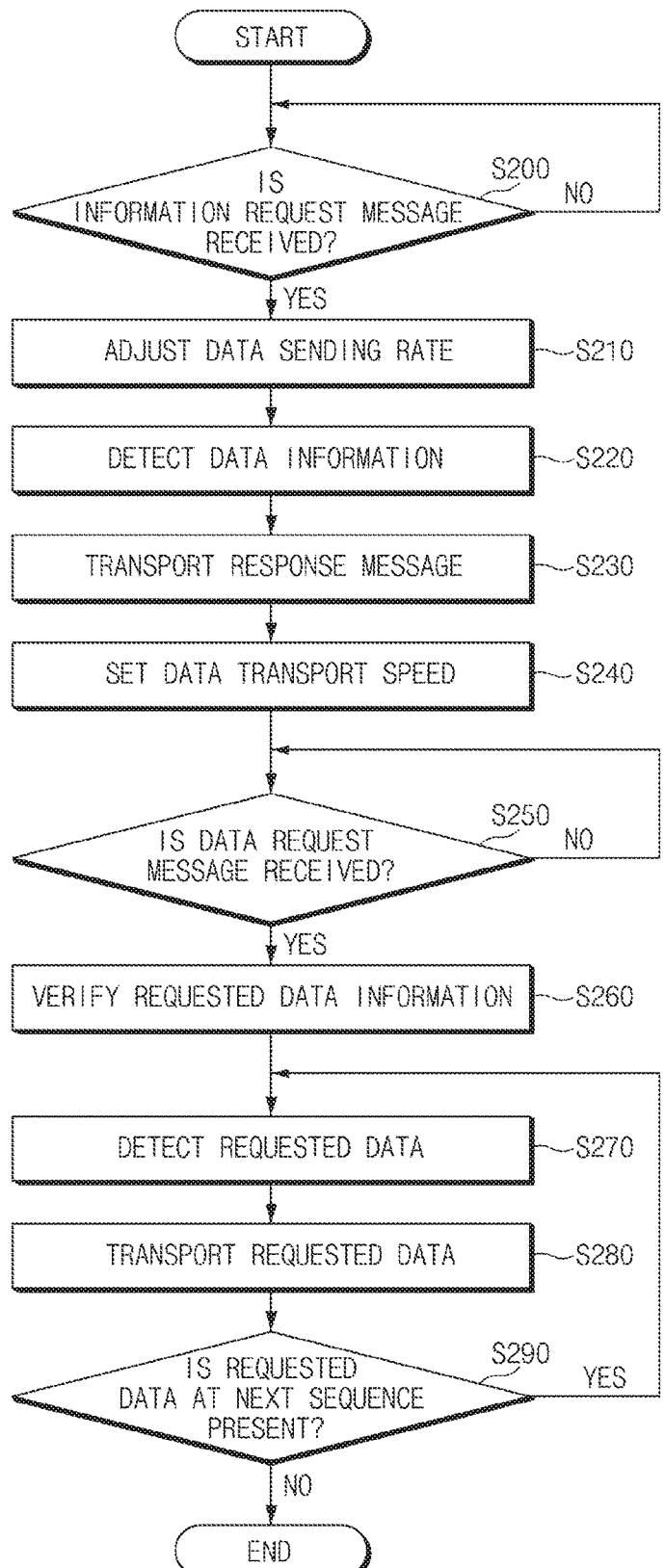
FIG. 3 is a flowchart illustrating an operational flow for a method for controlling data transport in a data providing apparatus according to the present invention.

FIG. 3 is a flowchart illustrating an operational flow for a method for controlling data transport in a data providing apparatus according to the present invention.

Referring to FIG. 3, when the data providing apparatus 200 receives an information request message for requesting the data information of the contents corresponding to the content ID from the data receiving apparatus 100 (S200), the data providing apparatus may adjust the data sending rate of the data providing apparatus 200 according to the data receiving rate of the data receiving apparatus 100, which is included in the information request message received during 'S200' (S210). Herein, the information request message may include the content ID and information on the data receiving rate of the data receiving apparatus 100.

The data providing apparatus 200 verifies the content ID from the information request message and detects data information regarding the contents corresponding to the verified content ID (S220). In this case, the data providing apparatus 200 generates a response message including the data information detected during 'S220' and transports the generated response message to the data receiving apparatus 100. Herein, the data information included in the response message may include information such as a total data size of the contents and a unit transport size (kbytes) of the contents and selectively include information on the data sending rate of the data providing apparatus 200.

The data providing apparatus 200 transports the response message corresponding to the information request message from the data receiving apparatus 100 and thereafter, sets a data transport speed according to the data sending rate adjusted during 'S210' (S240) and stands by until there is a request from the data receiving apparatus 100.

Thereafter, when the data request message for requesting transportation of the requested data is received from the data receiving apparatus 100 (S250), information of the requested data may be verified from the received data request message (S260). Herein, the data request message includes start information and end information of the requested data.

Therefore, the data providing apparatus 200 verifies the start information and the end information of the requested data from the data request message during 'S260' and detects data requested based on the start information and the end information of the requested data (S270).

When the requested data is detected during 'S270', the data providing apparatus 200 sequentially transports the requested data to the data receiving apparatus 100 from requested data corresponding to a start sequence (S270 to S290). In this case, the data providing apparatus 200 may generate and transport a response message including sequence information of the data detected at the time of transporting the detected data and payload data.

'S270' to 'S290' are performed repeatedly until transporting requested data corresponding to an end sequence is completed and when transporting the requested data corresponding to the end sequence is completed, the process ends.

Meanwhile, in the case where unreceived data is generated among the requested data in the data receiving apparatus 100, when the data providing apparatus 200 receives a data re-request message for requesting retransportation of the unreceived data, the data providing apparatus 200 transports the unreceived data to the data receiving apparatus 100 by performing the processes after 'S250'.

Figure 4:
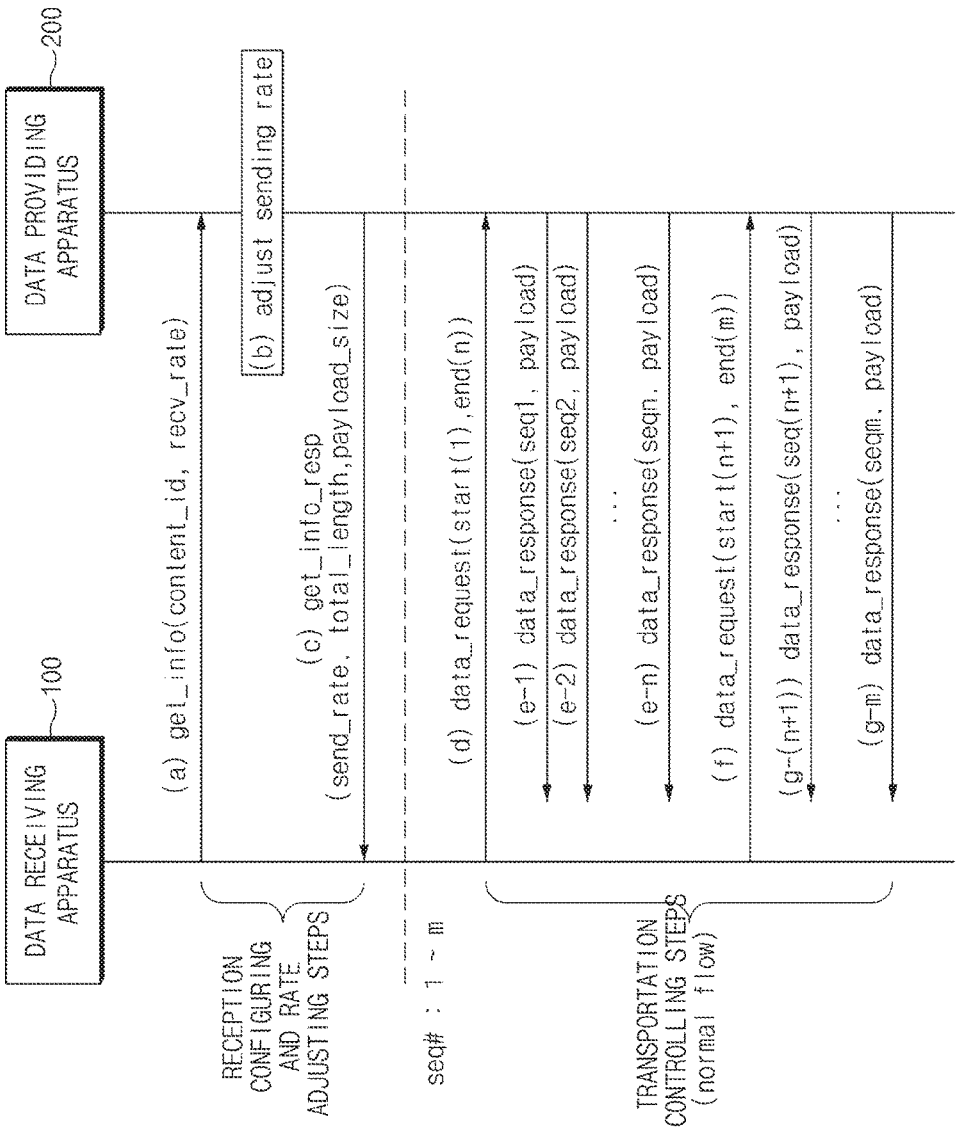
FIG. 4 is a diagram illustrating an exemplary embodiment of a message flow for a method for controlling data transport in an ID based communication system according to the present invention.

FIG. 4 is a diagram illustrating an exemplary embodiment of a message flow for a method for controlling data transport in an ID based communication system according to the present invention.

Referring to FIG. 4, the data receiving apparatus 100 as a preparation process for receiving the data of the contents corresponding to the content ID transports an information request message get_info(content_id, recv_rate) for requesting information on data of the corresponding contents to the data providing apparatus 200 as described in operation (a). As described in operation (a), the information request message may include content_id, recv_rate. Herein, content_id represents an ID of content to be requested and recv_rate means the data receiving rate (kbps) of the data receiving apparatus 100. Herein, recv_rate may be set to a value provided in an ID packet transfer function of the host or decided by the application. The data receiving apparatus 100 may announce sending rate acceptable by the data receiving apparatus 100 through recv_rate.

Thereafter, the data providing apparatus 200 may adjust the data sending rate of the data providing apparatus 200 based on recv_rate received in operation (a) as described in operation (b) and transports the response message get_info_resp(send_rate, total_length, payload_size) for the information request message to the data receiving apparatus 100 as described in operation (c).

Herein, send_rate represents the data sending rate of the data providing apparatus 200. In this case, send_rate may not be more than recv_rate of the data receiving apparatus 100 and set to a value equal to recv_rate or smaller than recv_rate.

Total_length represents the total size of the data corresponding to the contents and payload_size represents the unit transport size (Kbyte) for the data of the contents. In this case, payload_size is a value not decided dependently by characteristics of a transfer network such as a maximum segmentation size (MSS) but a value autonomously decided in the contents itself by using utilization of the contents. The data providing apparatus 200 sets a sending speed of data according to send_rate and prepares for a response to a data request.

Herein, the data receiving apparatus 100 may determine the total number of data based on send_rate, total_length, and payload_size included in the response message received in operation (c). Further, the data receiving apparatus 100 may calculate even payload_size at a last sequence. In the exemplary embodiment of FIG. 4, it is assumed and described that the total number of data is m.

The data receiving apparatus 100 decides the requested data based on the specifications such as send_rate, total_length, payload_size, the total number of data, payload_size at the last sequence, the data receiving rate for the data receiving apparatus 100, and the buffer size.

As one example, the data receiving apparatus 100 decides first data to n-th data as the requested data and transports a data request message data_request(start(1), end(n)) for requesting transportation of the requested data to the data providing apparatus 200 as described in operation (d). Herein, start( ) represents start sequence information of the requested data and end( ) represents end sequence information of the requested data.

The data providing apparatus 200 verifies the sequence information 1 to n of the requested data from the data request message received in operation (d) and sequentially transports data of sequences corresponding to 1 to n as described in operations (e-1) to (e-n).

In this case, when receiving up to data at the last sequence requested in operation (e-n) is completed, the data receiving apparatus 100 may transport to the data providing apparatus 200 data request messages data_request(start(n+1), end(m)) for residual (n+1) to m-th data among the data of the corresponding contents as described in operation (f).

Similarly, the data providing apparatus 200 verifies the sequence information n+1 to m of the request message from the data request message received in operation (f) and sequentially transports data of the sequences corresponding to n+1 to m as described in operations (g−(n+1)) to (g-m).

In this case, in operations (e-1) to (e-n) and operations (g−(n+1)) to (g-m), the requested data is transported while being included in a response message data_response(seq#, payload). Herein, seq# represents a sequence number of the corresponding data and payload represents payload data.

Therefore, the data receiving apparatus 100 may decide transport statuses of data corresponding to the contents in the data receiving apparatus 100 side and more efficiently receive the data corresponding to the contents by requesting the data according to the decision.

Figure 5:
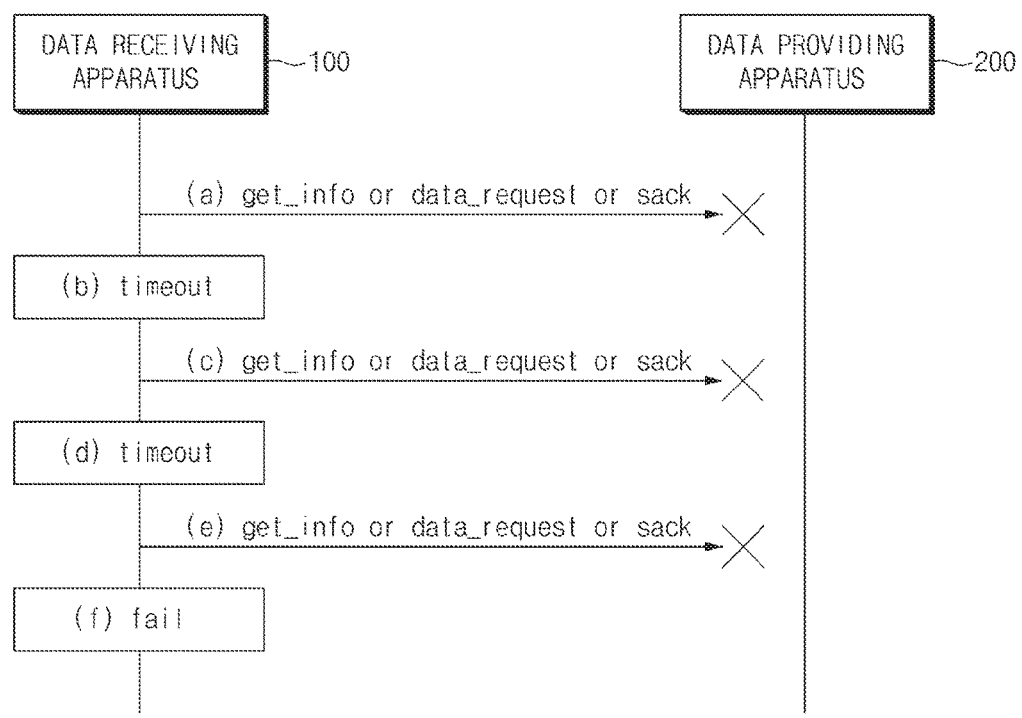
FIGS. 5 and 6 are diagrams illustrating an exemplary embodiment of an error processing operation for the method for controlling data transport in the ID based communication system according to the present invention.
Figure 6:
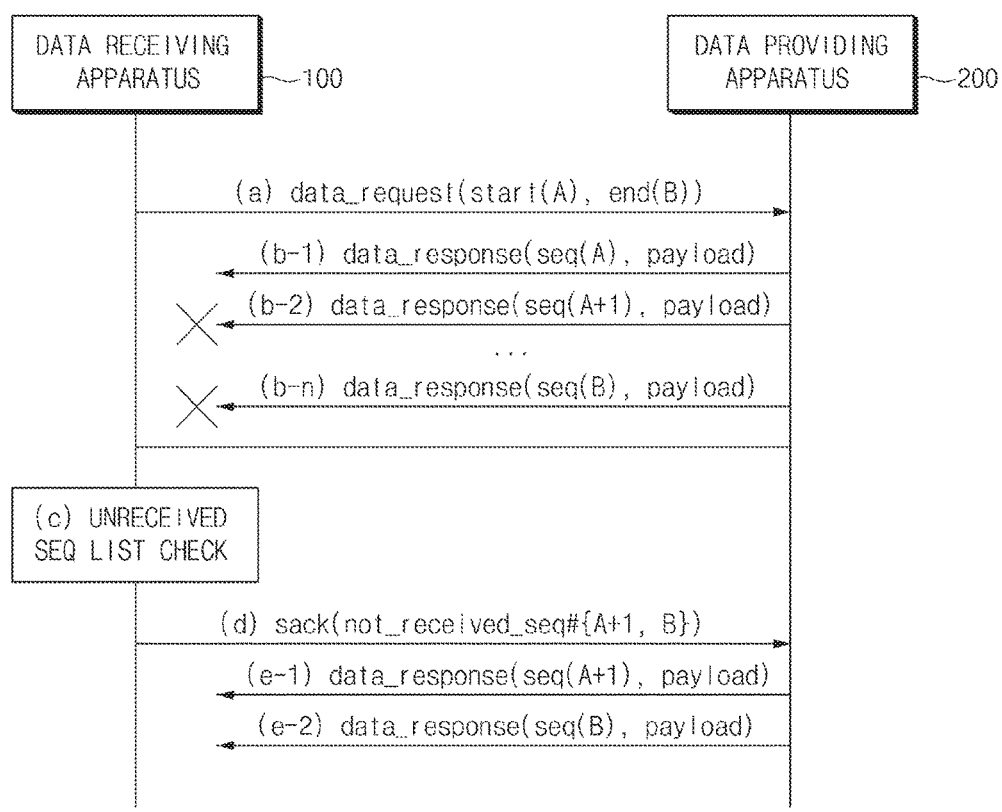

FIGS. 5 and 6 are diagrams illustrating an exemplary embodiment of an error processing operation for the method for controlling data transport in the ID based communication system according to the present invention.

First, FIG. 5 illustrates an error processing operation of a request message.

Referring to FIG. 5, when the data receiving apparatus 100 transports to the data providing apparatus 200 an information request message get_info( ), a data request message data_request( ), or a data re-request message sack( ), the corresponding request message may not be transported to the data providing apparatus 200 or a response to the corresponding request message may not be received as described in operation (a).

In this case, the data receiving apparatus 100 performs a re-request based on timeout as described in operations (b) to (e). Herein, a value of timeout is a value which may be set in the data receiving apparatus 100. In this case, a default value of timeout may be set to a time, for example, 1 second. Further, the default value of timeout may be set to the number of times, for example, two times.

When there is no response during a predetermined timeout, the data receiving apparatus 100 processes the corresponding request message as a request fail as described in operation (f).

Meanwhile, when a delay response is reached at the time of performing the re-request by timeout, the data receiving apparatus 100 may reset the timeout value.

Meanwhile, FIG. 6 illustrates an error processing operation of a received message.

Referring to FIG. 6, the data receiving apparatus 100 transports to the data providing apparatus 200 a data request message (data_request(start(A), end(B))) for requesting data between sequence A and sequence B as described in operation (a). In this case, the data providing apparatus 200 verifies requested data sequence information A, A+1, B from the data request message received in operation (a) and sequentially transports data of sequences corresponding to A to B as described in operations (b-1) to (b-n).

Herein, when the data receiving apparatus 100 may not receive the data corresponding to sequences A+1 and B transported in operations (b-2) and (b-n), the data receiving apparatus 100 maintains a receiving status of the data until operation (b-n) occurs and thereafter, verifies a sequence list for the unreceived data as described in operation (c).

The data receiving apparatus 100 transports to the data providing apparatus 200 a data re-request message sack (not_received_seq{A+1, B} for requesting the data corresponding to sequences A+1 and B as described in operation (d) based on the sequence list verified in operation (c).

Therefore, the data providing apparatus 200 re-transports the data corresponding to sequences A+1 and B to the data receiving apparatus 100 as described in operations (e-1) and (e-2) according to the data re-request message received in operation (d). When the re-request is made through the data re-request message sack( ) and thereafter, the message reaches the data receiving apparatus 100 as the delay response, the corresponding message is normally received and buffered and thereafter, the message retransported by the re-request may be disregarded.

Figure 7:
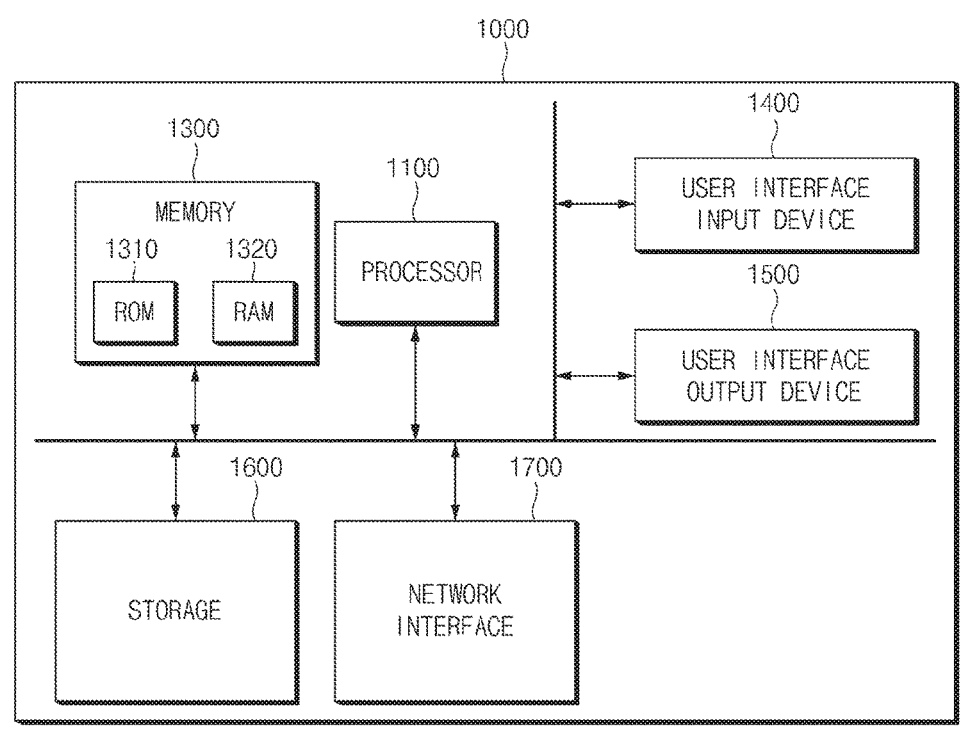
FIG. 7 is a diagram illustrating a computing system to which the apparatus according to the present invention is applied.

Meanwhile, FIG. 7 is a diagram illustrating a computing system to which the apparatus according to the present invention is applied.

Referring to FIG. 7, the computing system 1000 may include at least one processor 1100, a memory 1300, a user interface input device 1400, a user interface output device 1500, a storage 1600, and a network interface 1700 connected through a bus 1200.

The processor 1100 may be a semiconductor device that processes commands stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Steps of a method or an algorithm described in association with the exemplary embodiments disclosed in the specification may be directly implemented by hardware and software modules executed by the processor 1100, or a combination thereof. The software module may reside in storage media (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in a user terminal. As yet another method, the processor and the storage medium may reside in the user terminal as individual components.

Hereinabove, although the present invention has been described by specific matters such as detailed components, limited exemplary embodiments, and drawings, they have been provided only for assisting in the entire understanding of the present invention. Therefore, the present invention is not limited to the exemplary embodiments. Various modifications and changes may be made by those skilled in the art to which the present invention pertains within the scope without departing from an essential characteristic of the present invention. The spirit of the present invention should not be defined only by the described exemplary embodiments, and it should be appreciated that claims to be described below and all technical spirits which are evenly or equivalently modified are included in the claims of the present invention.

What is claimed is:

1. A method for controlling data transport in an ID based communication system, the method comprising:
generating and transporting, by a data receiving apparatus, an information request message for requesting data information of contents corresponding to a content ID, the information request message further including a data receiving rate of the data receiving apparatus;
receiving, by the data receiving apparatus, a response message including the data information regarding the contents corresponding to the content ID from a plurality of data providing apparatuses providing the contents requested by the data receiving apparatus, a total data size of the contents and a unit transport size of the contents, and a data sending rate of the data providing apparatus;
determining, by the data receiving apparatus, the total number of the data corresponding to the contents based on the total data size of the contents and the unit transport size of the contents included in the response message;
deciding, by the data receiving apparatus, one or more requested data among the data corresponding to the contents based on the data sending rate of the data providing apparatus, the total data size of the contents, the unit transport size of the contents, the data receiving rate of the data receiving apparatus, and a buffer size and generating and transporting a data request message for requesting transportation of the requested data to the data providing apparatus; and
receiving, by the data receiving apparatus, a detected data from the data providing apparatus,
wherein the data providing apparatus detects one or more requested data verified from the data request message among the data corresponding to the contents, and
wherein the data sending rate is adjusted, by the data providing apparatus, based on the data receiving rate.

2. The method of claim 1, wherein the data request message includes start information and end information for one or more request data among the data corresponding to the contents.

3. The method of claim 2, wherein in the receiving of the detected data, requested data corresponding to a start sequence among the detected requested data is first sequentially received based on the start information and the end information of the requested data included in the data request message.

4. The method of claim 1, wherein in the receiving of the detected data, a response message including sequence information of the detected data and payload data is received.

5. The method of claim 1, wherein the information request message includes the content ID and the data receiving rate of the data receiving apparatus.

6. The method of claim 1, further comprising:
setting a data sending speed of the data providing apparatus based on the adjusted data sending rate.

7. The method of claim 1, further comprising: transporting, when unreceived data is present among the requested data, a data re-request message for requesting transportation of the unreceived data to the data providing apparatus.

8. The method of claim 7, wherein the transporting of the data re-request message includes generating a sequence list based on sequence information regarding the unreceived data, and when transportation of the data from the data providing apparatus is completed, retransportation of the data corresponding to the sequence list is requested.

9. The method of claim 7, further comprising: retransporting requested data corresponding to a sequence for the unreceived data to the data receiving apparatus from the data providing apparatus based on the data re-request message including the sequence information regarding the unreceived data among the requested data.

10. The method of claim 1, further comprising: after the generating and transporting of the information request message, setting, by the ID based communication network apparatus, a path between the data receiving apparatus and the corresponding data providing apparatus by determining the position of the data providing apparatus that is to transfer the information request message based on the content ID included in the information request message.

11. An ID based communication system comprising:
a plurality of data providing apparatuses managing data corresponding to one or more contents and information of the data and providing requested data and the information of the data; and
a data receiving apparatus transporting an information request message for requesting data information of contents corresponding to a content ID, the information request message further including a data receiving rate of the data receiving apparatus, and verifying the data information regarding the contents from a response message received in response to the information request message to request decided requested data among data corresponding to the contents to any one data providing apparatus providing the contents requested by the data receiving apparatus,
wherein the data receiving apparatus determines the total number of the data corresponding to the contents based on a total data size of the contents and a unit transport size of the contents included in the response message and decides some or all of the data corresponding to the contents as the requested data according to specifications such as a data sending rate of the data providing apparatus, the total data size of the contents, the unit transport size of the contents, the data receiving rate of the data receiving apparatus, and a buffer size,
wherein the data receiving apparatus generates and transports a data request message for requesting transportation of the requested data to the data providing apparatus, and receives the requested data from the data providing apparatus,
wherein the data providing apparatus adjusts the data sending rate based on the data receiving rate, and wherein the response message includes the adjusted data sending rate.

12. The system of claim 11, wherein any one data providing apparatus verifies and detects start information and end information regarding the requested data from the data receiving apparatus and first sequentially transports requested data corresponding to a start sequence among the detected data.

13. The system of claim 11, wherein the data receiving apparatus, when unreceived data is present among the requested data, generates a sequence list based on the sequence information regarding the unreceived data and when transportation of the data from the data providing apparatus is completed, requests retransportation of data corresponding to the sequence list to the data providing apparatus.

14. The system of claim 11, wherein any one data providing apparatus retransports requested data corresponding to the sequence for the unreceived data to the data receiving apparatus when receiving the sequence information regarding the unreceived data among the requested data from the data receiving apparatus.

15. The system of claim 11, further comprising: an ID based communication network apparatus determining the position of the data providing apparatus that is to transfer the information request message based on the content ID included in the information request message between the data receiving apparatus and the multiple data providing apparatuses to set a path between the data receiving apparatus and the corresponding data providing apparatus and transfer data.

* * * * *